United States Patent [19]
Waldrop et al.

[11] Patent Number: 5,307,476
[45] Date of Patent: Apr. 26, 1994

[54] FLOPPY DISK CONTROLLER WITH DMA VERIFY OPERATIONS

[75] Inventors: Timothy K. Waldrop, Houston; Paul R. Culley, Cypress, both of Tex.

[73] Assignee: Compaq Computer Corporation, Houston, Tex.

[21] Appl. No.: 999,470

[22] Filed: Dec. 29, 1992

Related U.S. Application Data

[63] Continuation of Ser. No. 431,667, Nov. 3, 1989, abandoned.

[51] Int. Cl.⁵ .............................................. G06F 13/00
[52] U.S. Cl. .................................. 395/425; 364/236.2; 364/242.3; 364/242.31; 364/268.3; 364/285.4; 364/946; 364/952.1; 364/268.6
[58] Field of Search .......... 395/425; 364/DIG. 1 MS, 364/254.8, 256.8, 964.3, 968

[56] References Cited
U.S. PATENT DOCUMENTS 4,473,879 9/1984 Tachiuchi et al. ........... 364/DIG. 1
4,481,578 11/1984 Hughes et al. ............... 364/DIG. 1
4,527,237 7/1985 Frieder et al. ................ 364/DIG. 1

Primary Examiner—Joseph L. Dixon
Assistant Examiner—B. James Peikari
Attorney, Agent, or Firm—Pravel, Hewitt, Kimball & Krieger

[57] ABSTRACT

The present invention includes two variations of an apparatus which generate a version of the IORC* bus signal that is supplied to the read strobe input of a floppy disk controller that is asserted at the appropriate time during verify cycles between the floppy disk controller and a DMA controller. These designs allow an 82077 floppy disk controller to operate properly in FIFO mode when it is being used with software that does not require generation of this signal. The designs include use of a PAL and certain bus signal inputs to generate a signal which is asserted at the appropriate times during verify transfers. This signal is combined with the regular IORC* bus signal to produce the signal that is provided to the read strobe input of the floppy disk controller.

3 Claims, 12 Drawing Sheets

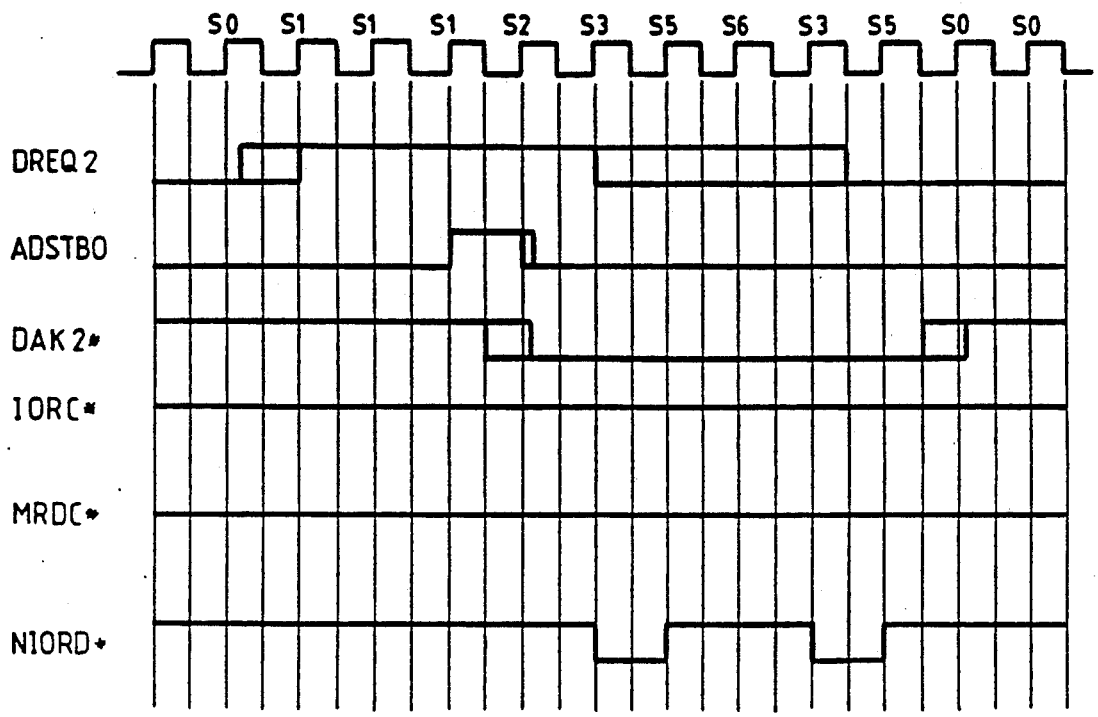
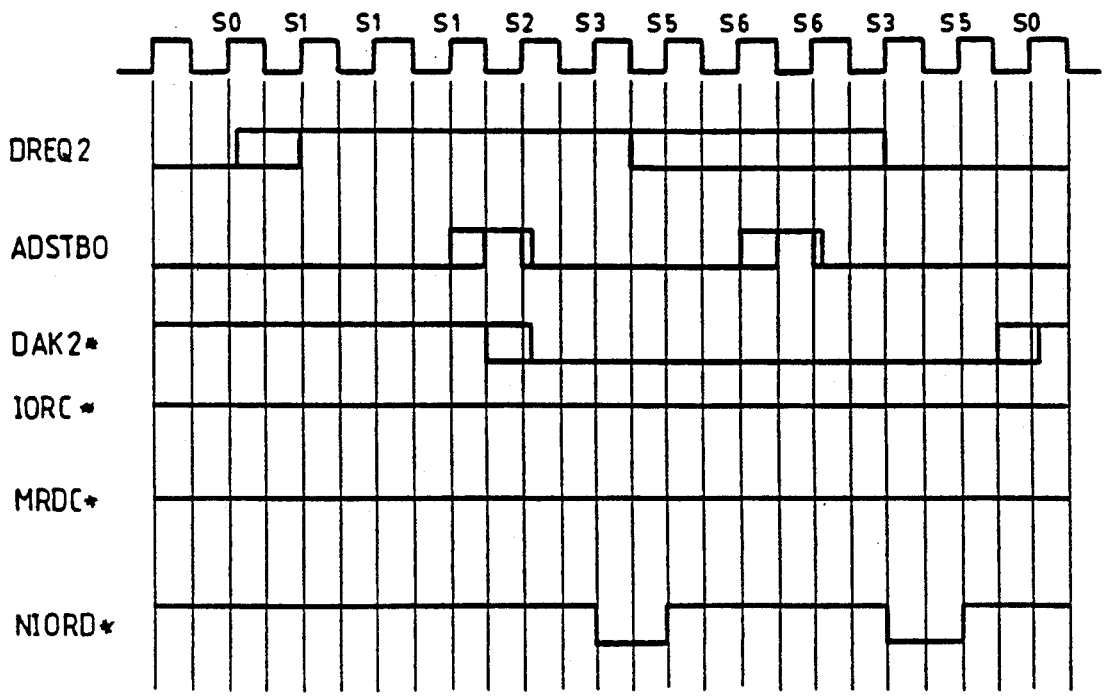

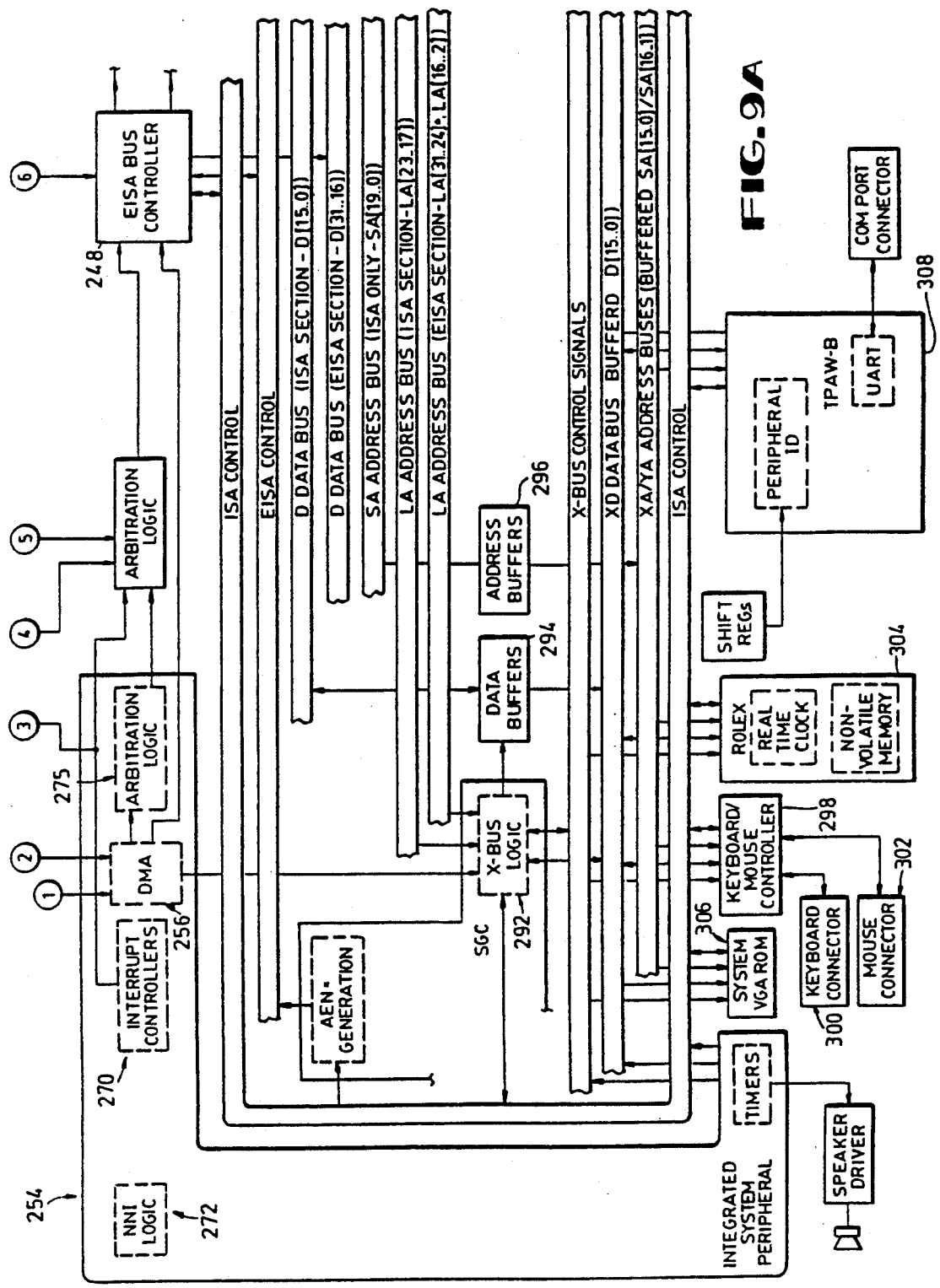

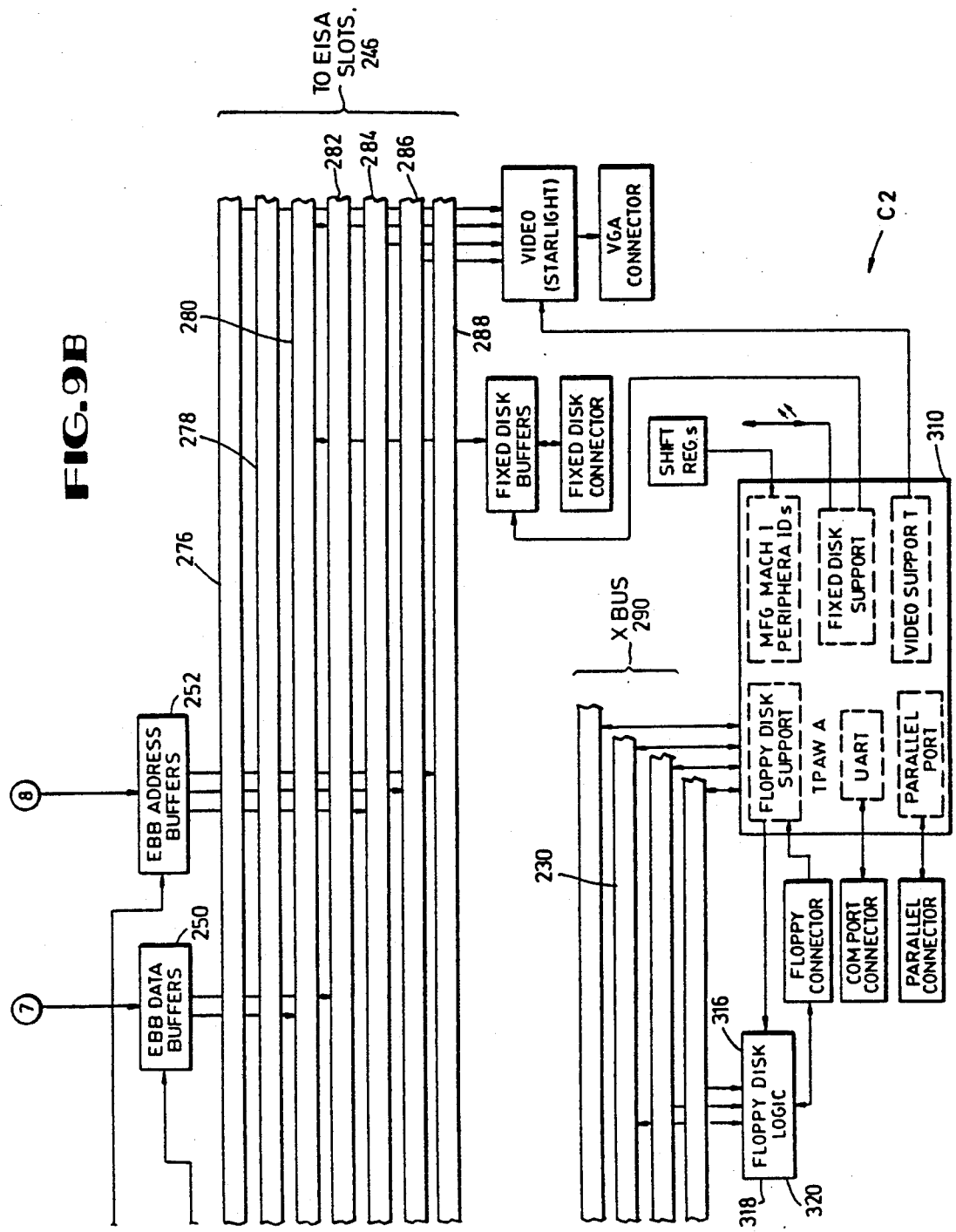

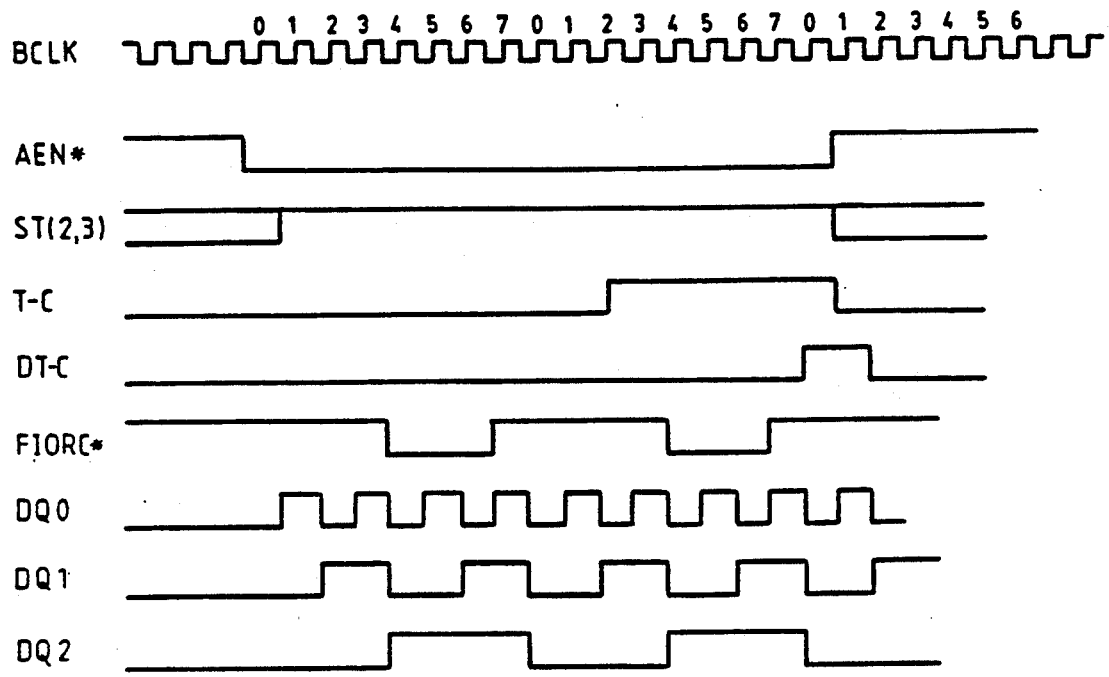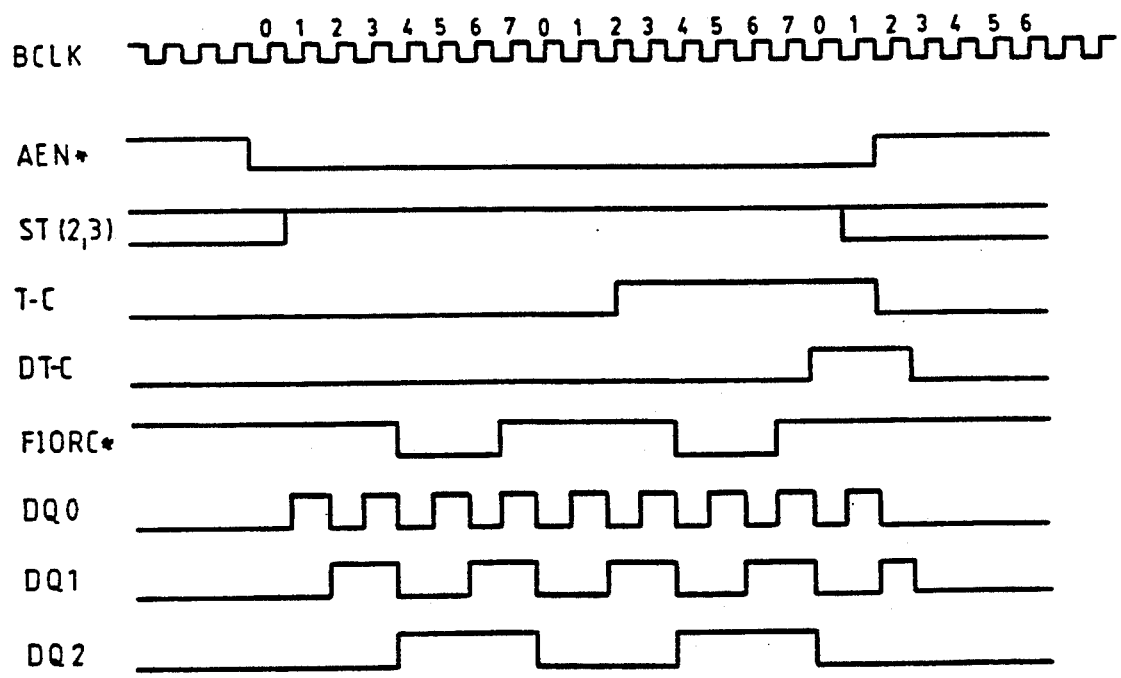

FLOPPY DISK CONTROLLER WITH DMA VERIFY OPERATIONS

This is a continuation of co-pending application Ser. No. 07/431,667 filed on Nov. 3, 1989 now abandoned.

BACKGROUND OF THE INVENTION

1. Field of the Invention

The present invention relates to data transfer in computer systems and more particularly to data transfer considerations between floppy disk controllers and direct memory access (DMA) controllers.

2. Description of the Prior Art

The personal computer industry is a dynamic and growing field that continues to evolve as new innovations occur. The driving force behind this innovation has been the increasing demand for faster and more powerful personal computers. Another major factor in the success of the personal computer industry has been that, in general, personal computer designers have strived to maintain compatibility between the newer systems and system components they are developing, and the older systems and system components that are currently on the market or in use. Historically, the personal computer has developed as a modular system incorporating an array of various components that each perform a particular task contributing to the functionality of the computer system. These various components have generally included random access memory, a microprocessor, and various coprocessors and support chips, among others. One method that has generally been used to increase computer speed has centered on increasing the performance of the various components which make up the computer, including the coprocessors and the various support chips which work in conjunction with the microprocessor and enable the computer to transfer data and process instructions. However, in this search for increased system component performance, personal computer chip designers have also generally attempted to ensure that previous generations of computer system components and software remain compatible with the latest computer system components they are developing.

An area of microprocessor systems design that has received attention in the pursuit of computer performance enhancement has been that of the data transfer rate between the computer's memory and the various I/O peripheral devices which are attached to the computer. In personal computers compatible with those previously manufactured and sold by International Business Machines Corp. (IBM), data transfers between memory and the various input/output (I/O) peripheral devices can be accomplished by means of a microprocessor support chip called the direct memory access (DMA) Controller. The DMA Controller allows data transfer between memory and the various I/O peripherals without the involvement of the microprocessor, thereby easing the workload of the microprocessor.

One of the standard DMA controllers that has generally been used in IBM compatible computers which utilize the Industry Standard Architecture (ISA) developed over the years is the Intel Corporation (Intel) 8237 DMA controller, which is described in the Microprocessor and Peripheral Handbook, Volume I, published by Intel. The 8237 DMA controller generally includes three data transfer modes. In single transfer mode, the DMA device is programmed to make one transfer only. In block transfer mode, the DMA I/O device is activated by a DMA request to continue making transfers during the service until a TC (terminal count) caused by the word count going to FFFFh, or an external end of process (EOP*), which signifies that the DMA service is completed, is encountered. In demand transfer mode the device is programmed to continue making transfers until a TC or external EOP* is encountered or until the DREQ signal goes inactive. Thus, in this mode transfers may continue until the I/O device has exhausted its data capacity Each of these modes generally includes a feature whereby the respective DMA channel can be programmed for an autoinitialization. During an autoinitialize, the original values of the current page, current address and current word count registers are automatically restored from the base page, address, and word count registers of that channel following an assertion of the terminal count (T-C) signal. Following an autoinitialize, the channel is ready to perform another DMA service without CPU intervention as soon as a valid DMA request is detected.

In conjunction with these data transfer modes, DMA devices capable of operating according to the Extended Industry Architecture (EISA) may generally use one of four cycle control sequences to transfer date between the DMA device and memory: ISA compatible cycles, Type "A" cycles, Type "B" cycles, or burst DMA cycles. ISA compatible or normal cycles are used by ISA DMA devices to transfer single bytes of data, and this cycle executes one transfer cycle in 8 BCLK periods. The remaining modes of delay may generally support 8-, 16- or 32-bit DMA devices. In Type "A" DMA cycles, transfers that do not require data size translation execute one cycle every 6 BCLK periods. In Type "B" DMA cycles, transfers that do not require data size translation execute one cycle every 4 BCLK periods. Burst DMA cycles can perform a sequence of transfers between EISA burst memory and the DMA device using 1 BCLK period per transfer.

The 8237 DMA controller generally includes three different types of transfers that are used in its data transfer modes, these being read, write, and verify. As the names suggest, read transfers move data from memory to an I/O device, while write transfers move data from an I/O device to memory. Verify transfers, however, are somewhat of an anomaly in that they are pseudo transfers. During verify transfers, the 8237 operates as if it were performing a read or write transfer, generating addresses and responding to the appropriate control signals. However, in a verify transfer, the memory and I/O control lines all remain inactive, and no data is actually sent or received by the DMA controller. Generally only the DMA acknowledge (DAK*) lines are active during a DMA verify transfer and the DMA controller counts the number of BCLK signals so that the appropriate DAK* line has a defined pulse width, this generally being 9 BCLK pulses long. However, if verify transfers are repeated during block or demand DMA requests, each additional pseudo transfer adds only 8 BCLKS, and the DAK* line remains at a low level for repeated transfers.

One I/O peripheral in particular that is involved in a large amount of data transfer with memory is the floppy disk drive of a computer system. In IBM compatible computers, the floppy disk drive of a computer system is generally controlled by a support chip called the floppy disk controller. One of the tasks of the floppy disk controller is to work in conjunction with the DMA controller to facilitate the transfer of data between the floppy disk drive of the computer system and the computer's memory. Generally, before there can be a transfer of data between the floppy disk controller and the DMA controller, a verify transfer is used to determine the type of floppy disk drive present within the system, this determination affecting the data rate that will be used in the upcoming transfer.

To determine the data rate, the systems software programs the DMA controller for the verify mode operation and issues a normal read command to the floppy disk controller. When the floppy disk controller has obtained the data from the floppy disk that is to be transferred to memory, it issues a DMA request (DREQ) signal to request the services of the DMA controller to coordinate the upcoming transfer. If the DMA controller is available, then it responds with a DMA acknowledge (DAK*) signal. However, since the DMA controller is in verify mode, the I/O control lines all remain inactive until the verify transfer is completed.

Previously, many IBM compatible computers were developed incorporating the μPD765 floppy disk controller produced by NEC Electronics, Inc. The NEC μPD765 is an IBM PC compatible floppy disk controller that only transfers one byte per data transfer cycle. When the DMA controller was ready to begin the process of transferring data between the floppy disk drive and memory, a verify cycle with the 765 floppy disk controller was performed to determine the proper data rate that was to be used. The 765 floppy disk controller circuitry was designed so that when it received the DAK signal, the data byte was transferred from the 765 floppy disk controller to the system data bus. Thus, the 765-based systems did not reference the I/O control lines in transferring data but used only the DAK signal.

The 765 floppy disk controller was generally limited in its data transfer capability, however, because it could only transfer one byte per data transfer cycle. This resulted in a low latency time so that the floppy disk controller had to be accessed by the DMA controller a short time after it had requested access or data errors would occur. This low latency or response time became a problem with more complex computer systems. Therefore Intel Corporation (Intel), a major manufacturer of computer chips and microprocessors for IBM compatible computers, developed a new floppy disk controller called the 82077, which is capable of transferring data in a burst mode from a first-in, first-out (FIFO) register. The FIFO is used preferably to buffer data being received by the floppy disk controller from the floppy disk drive so that the latency time can be increased. Additionally, the FIFO allows block transfers to be made with the floppy disk controller, improving data transfer rates Generally, the FIFO is 16 bytes in size, and all data transfers involving the floppy disk controller pass through the FIFO after FIFO mode operation is enabled. For further details on the 82077, please refer to the Microprocessor and Peripheral Handbook, Volume II, published by Intel.

Like the NEC 765 floppy disk controller, the Intel 82077 floppy disk controller is generally required because of software compatibility concerns to operate with verify cycles in order to determine the correct data rate of the upcoming data transfer. However, the 82077 has been designed such that it generally receives an I/O control signal referred to as IORC* to signify that it may clock data out from its FIFO. Thus, each pulse of the IORC* signal results in the transfer of one byte. However, the IORC* signal is not activated by the DMA controller when verify operations are occurring. Thus, the data is not removed from the FIFO and overrun errors can occur as more data is received from the floppy disk drive. The DAK signal cannot be used to clock out data from the FIFO because it only changes state once per DMA request, not as many times as the IORC* signal may toggle during burst or demand transfers.

SUMMARY OF THE INVENTION

The present invention includes two design variations of an apparatus which generate IORC* signal pulses at the appropriate time during DMA verify cycles, as well as in read and write cycles, to enable an 82077 floppy disk controller to transfer data from its FIFO queue during verify cycles and thereby prevent overrun errors that would occur if the IORC* signal was not generated. These designs allow the Intel 82077 floppy disk controller to operate properly in the FIFO mode when it is being used with older and/or non-compatible systems software The first of these designs is intended for use in accordance with the Industry Standard Architecture (ISA), which is the architecture used in computers that are compatible with those previously manufactured and sold by International Business Machines Corporation (IBM). The second of these designs is intended for use with the Extended Industry Standard Architecture (EISA), which is an extended version of the Industry Standard Architecture that includes a 32-bit address bus and a 32-bit data bus, as well as other features and signals.

Each of the designs generally includes a programmable array logic (PAL) device that uses certain bus signal inputs and an internally developed state machine to generate a signal that is asserted at the appropriate time during a verify transfer between the floppy disk controller and the DMA controller. This signal is combined with the regular IORC* signal provided on the bus to produce a new version of the IORC* signal that is provided to the floppy disk controller. The new IORC* signal is asserted at the appropriate times during read and write transfers as it was previously, but is also asserted at the appropriate time during verify transfers.

BRIEF DESCRIPTION OF THE DRAWINGS

A better understanding of the Detailed Description can be obtained when the following detailed description of the preferred embodiment is considered in conjunction with the following drawings, in which:

FIGS. 4, 5, 6 and 7 are timing diagrams of various DMA transfers incorporating the first design according to the present invention;

FIGS. 8, 9A and 9B are schematic block diagrams of an EISA-based computer system incorporating the second design according to the present invention;

DESCRIPTION OF THE PREFERRED EMBODIMENTS

The present invention includes two variations of an apparatus which generate a new version of the IORC* bus signal for use by a floppy disk controller that generally has the same characteristics of the regular IORC* signal but is also asserted at the appropriate time during verify cycles from the DMA system. The direct memory access (DMA) controller used in the present invention is preferably compatible with the Intel 8237 DMA controller and the floppy disk controller used in the present invention is preferably the Intel 82077 floppy disk controller, but utilization of other controllers is also contemplated.

Figure 1:
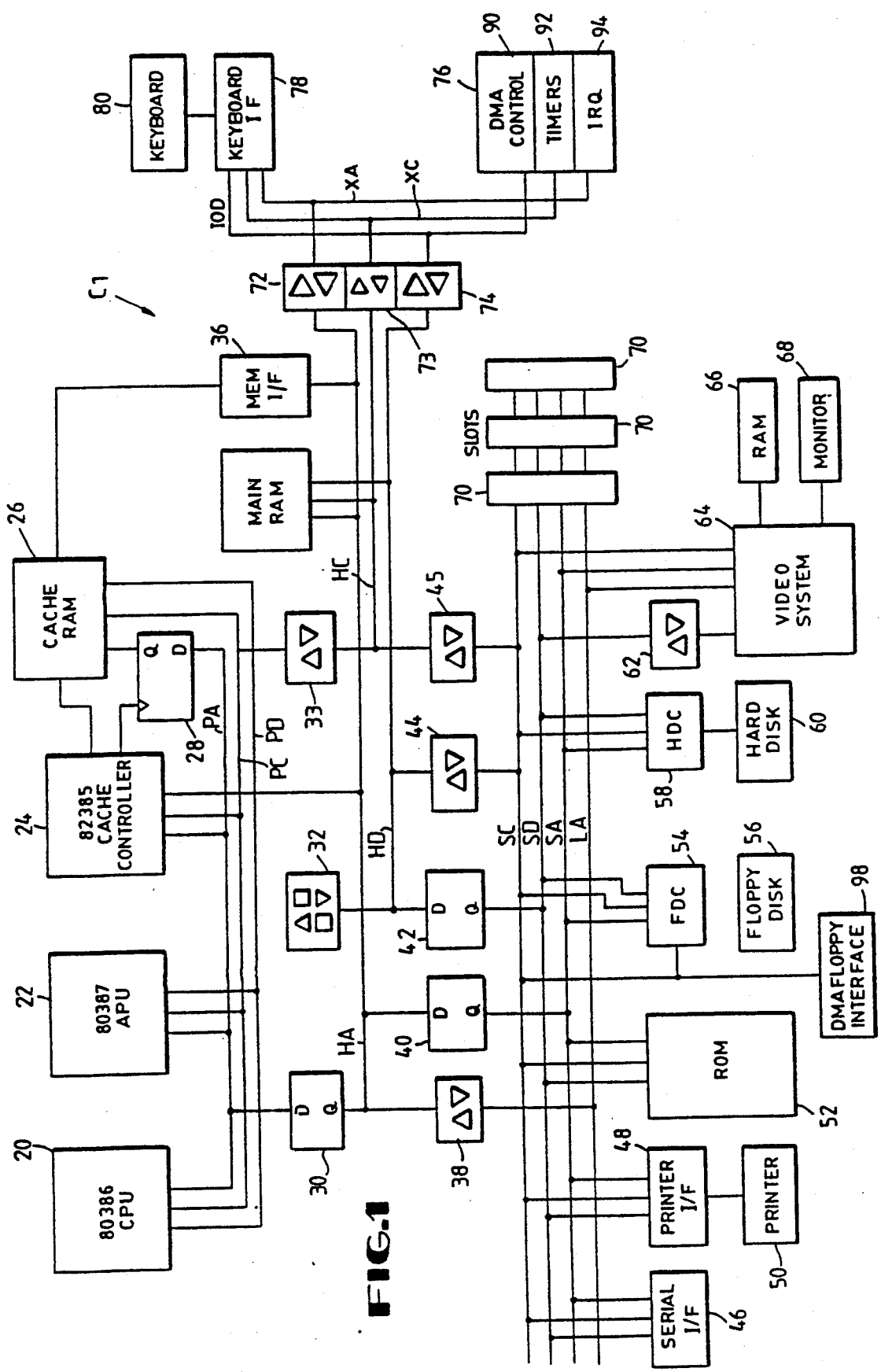
FIG. 1 is a block diagram of an ISA-based computer system incorporating the first design according to the present invention.

Referring now to FIG. 1, the letter C1 generally represents a computer based on the Industry Standard Architecture incorporating the first design according to the present invention. A number of different blocks are used in the computer C1. The microprocessor 20 used is preferably an 80386 microprocessor manufactured by Intel Corporation (Intel). The microprocessor 20 has an address bus PA, a data bus PD, and a control bus PC, these buses PA, PD and PC being referred to as the local buses. Coupled to the local bus are an arithmetic processing unit or numerical coprocessor 22, preferably an 80387 manufactured by Intel; a cache controller 24, preferably an 82385 manufactured by Intel; cache RAM 26 and an address latch 28. The cache controller 24 cooperates with the cache RAM 26 to provide the necessary control to handle a cache system in the computer C1. The local bus is connected to an intermediate bus by means of a latch 30 which connects the local address bus PA to an intermediate address bus HA. A latched transceiver 32 connects the local data bus PD to an intermediate data bus HD. A transceiver 33 connects the local control bus PC to an intermediate control bus HC. Connected to the intermediate bus is the main memory 34 in the computer C1 and a memory interface 36.

Various other buses are developed from the intermediate bus. For example, intermediate address bus HA is coupled by a transceiver 38 to an early system address bus LA and by a latch 40 to a latched system address bus SA. The intermediate data bus HD is coupled by a latch 42 and transceiver 44 to the system data bus SD. The intermediate control bus HC is coupled by a transceiver 45 to the system control bus SC. Numerous devices are coupled to the system buses LA, SA, SD, and SC as are a series of slots 70 which are used for receiving interchangeable circuit boards which contain additional functions which can be utilized in the computer C1. A serial interface 46 is connected to the system data bus SD, the latched system address bus SA and the system control bus SC. A printer interface 48 is also connected to the system data bus SD, the latched system address bus SA, and the system control bus SC, with a printer 50 being attached to the printer interface 48. The read only memory (ROM) 52 which contains the basic operating software of the computer C1 is connected to the system data bus SD, the latched system address bus SA, and the system control bus SC. A floppy disk controller 54 is connected to the system data bus SD, the latched system address bus SA, and the system control bus SC. A floppy disk unit 56 which is used for providing storage for the computer C1 is connected to the floppy disk controller 54. A DMA-floppy control interface 98 is connected to the system control bus SC and the floppy disk controller 54 to intercept the TORC* signal and develop a new signal for use by the floppy disk controller 54. A hard disk controller 58 is connected to the system data bus SD, the latched system address bus SA, and the system control bus SC with a hard disk unit 60 being attached to the hard disk controller 58. A video system 64 which controls the presentation of data to the user is connected to the early system address bus LA, the latched system address bus SA, the system control bus SC, and coupled to the system data bus SD by means of a transceiver 62. Connected to the video system 64 are the random access memory (RAM) 66 used to form the video memory and a monitor 68 which presents the desired display to the user. DMA-floppy interface logic of the present invention is connected to the system control bus SC and to the floppy disk controller 54.

Various other subsystems are coupled to the intermediate data, address and control buses, HD, HA and HC, respectively. A transceiver 72 is connected to the intermediate address bus HA and to an extended address bus XA. A transceiver 73 is connected to the intermediate control bus HC and to an extended control bus XC. A transceiver 74 is connected between the intermediate data bus HD and an input/output (I/O) data bus IOD. Connected to the extended address bus XA, the data bus IOD, and the extended control bus XC is a combined unit 76 which contains the DMA controller 90 for the computer C1, a series of timers 92 and the interrupt controller 94. A keyboard interface 78 is also connected to the extended address bus XA, the I/O data bus IOD and the extended control bus XC. A keyboard 80 is connected to the keyboard interface 78 to allow the user to enter desired character sequences and commands.

Familiarity with the signals forming the ISA is assumed in this description. For more details on the ISA signals and on the EISA signals, please reference the EISA specification, Version 3.1 contained in U.S. Pat. No. 5,101,492, issued Mar. 31, 1992, which patent is hereby incorporated by reference. Generally, when referring to signals in this description, an asterik (*) following a signal mnemonic indicates that it is logically true when a low voltage level is present, and angle brackets with included numbers after a signal mnemonic are used to indicate single or multiple bit positions in a wider logical signal, such as the DMA request lines. Additionally, in this description, the DMA request line DRQ<2> is generally referred to as the DREQ2 signal and the DMA acknowledge signal DAK*<2> is generally referred to as the DAK2* signal for brevity. The channel two of the DMA channel is conventionally used for the floppy disk controller in IBM PC compatible computer systems.

A brief summary of particular ISA signals is of interest. The BLCK signal, the synchronizing signal used in the system portion of the computer system C1 operates at a frequency between 8.333 MHz and 6 MHz, has a nominal duty cycle of 50% and is driven only by the system board. The AEN signal is asserted (high) during DMA cycles to prevent I/O slaves from misinterpreting DMA cycles as valid I/O cycles. The AEN* signal is an inverted version of the AEN signal. The IORC* signal is generally used to indicate that an I/O device may drive data onto the bus, this being the case for the 82077. An ISA I/O device generally drives data on the bus when the IORC* signal and the AEN* signal are simultaneously asserted. The device generally must hold the data valid until sampling the IORC* signal negated. However, in some cases, such as the 765 floppy disk controller circuits, the DAK* signal is used in conjunction with the internal state of the floppy disk controller to drive data onto the bus. The MRDC* signal is asserted to indicate that the addressed ISA memory slave should drive its data onto the memory bus.

The DRQ<x> lines are used by an I/O device to request DMA service from the DMA sybsystem. The requesting device generally holds the appropriate DRQ<x> lines asserted until the system board asserts the appropriate DMA acknowledge (DAK*<x>) signal. The DAK*<x> signals are asserted by the DMA controller to indicate that a particular channel has been granted the bus. For block or demand mode DMA transfers, the DAK*<x> signal remains asserted until the transfer completes or until the centralized arbitration controller preempts the DMA process. The T-C or terminal count signal is asserted by the DMA controller to indicate that a DMA channel's transfer count has reached the terminal count. The DMA controller asserts the T-C signal only while asserting the channel's DAK*<x> signal. A DMA device decodes the T-C signal with the appropriate DAK*<x> signal asserted to determine when the DMA transfer has been completed.

Figure 2:
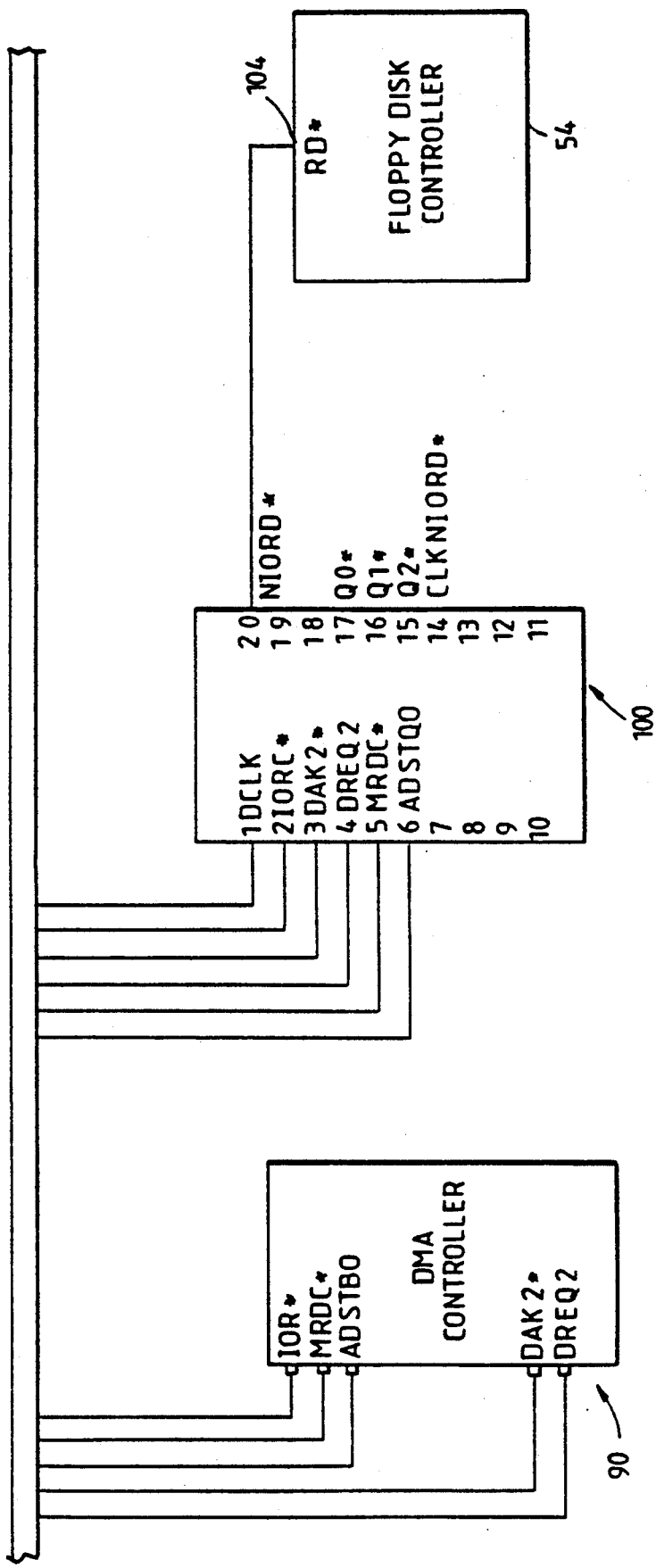
FIG. 2 is a more detailed block diagram of the DMA-Floppy Interface Logic of FIG. 1 interfaced with the DMA controller and the floppy disk controller of FIG. 1 according to the present invention.

Referring now to FIG. 2, the first design according to the present invention is intended for ISA-based computers and includes a programmable array logic (PAL) device 100 which includes a number of flip-flops and utilizes certain bus signals that are output from the DMA controller 90 as well as an internally generated state machine M1 (FIG. 3) to generate a new version of the IORC* signal called NIORD* that is provided to the read or RD* input 104 of the floppy disk controller 54. The bus signals used as inputs to the PAL 100 from the DMA controller 90 include the IORC* signal; the MRDC* signal; the DAK2* signal; and the DREQ2 signal. The DCLK signal is a version of the BCLK signal that prferably has one-half of the frequency of the BCLK signal.

The ADSTBO signal is input to the PAL 100 directly from the DMA controller 90. The ADSTBO signal is used to load the multiplexed eight higher order address bits from the DMA controller 90 into a latch, from which they are enabled onto the address bus through a three-state enable. During block and demand transfer mode services, which include multiple transfers, the addresses generated will generally be sequential, and for many transfers the data held in the external latch will remain the same because the upper eight address bits will remain the same. This data need only change when a carry or borrow from A7 to A8 takes place in the normal sequence of addresses, and therefore the DMA controller 90 updates the A8-A15 address bits only as necessary. When this updating is necessary, the 8237 generally inserts extra states to accomplish this. The DCLK signal is connected to the clock input of the PAL 100.

The PAL 100 uses these input signals to generate an internal 3-bit state machine M1 which is clocked by the DCLK signal. The different states of the state machine M1 are represented by each of the bits Q0*, Q1* and Q2*, which are represented as outputs from the PAL 100 but are fed back for use by the next state logic contained in the PAL 100. The state machine M1 coordinates the proper generation of a signal called CLKNIORD*, which is represented as an output of the PAL 100 and is asserted at the appropriate time during a verify transfer. The CLKNIORD* signal and the IORC* signal are combined inside the PAL 100 to produce the NIORD* signal, which is output from the PAL 100 and is connected to the RD* input 104 of the floppy disk controller 54, which controls the output of data from the FIFO.

Figure 3:
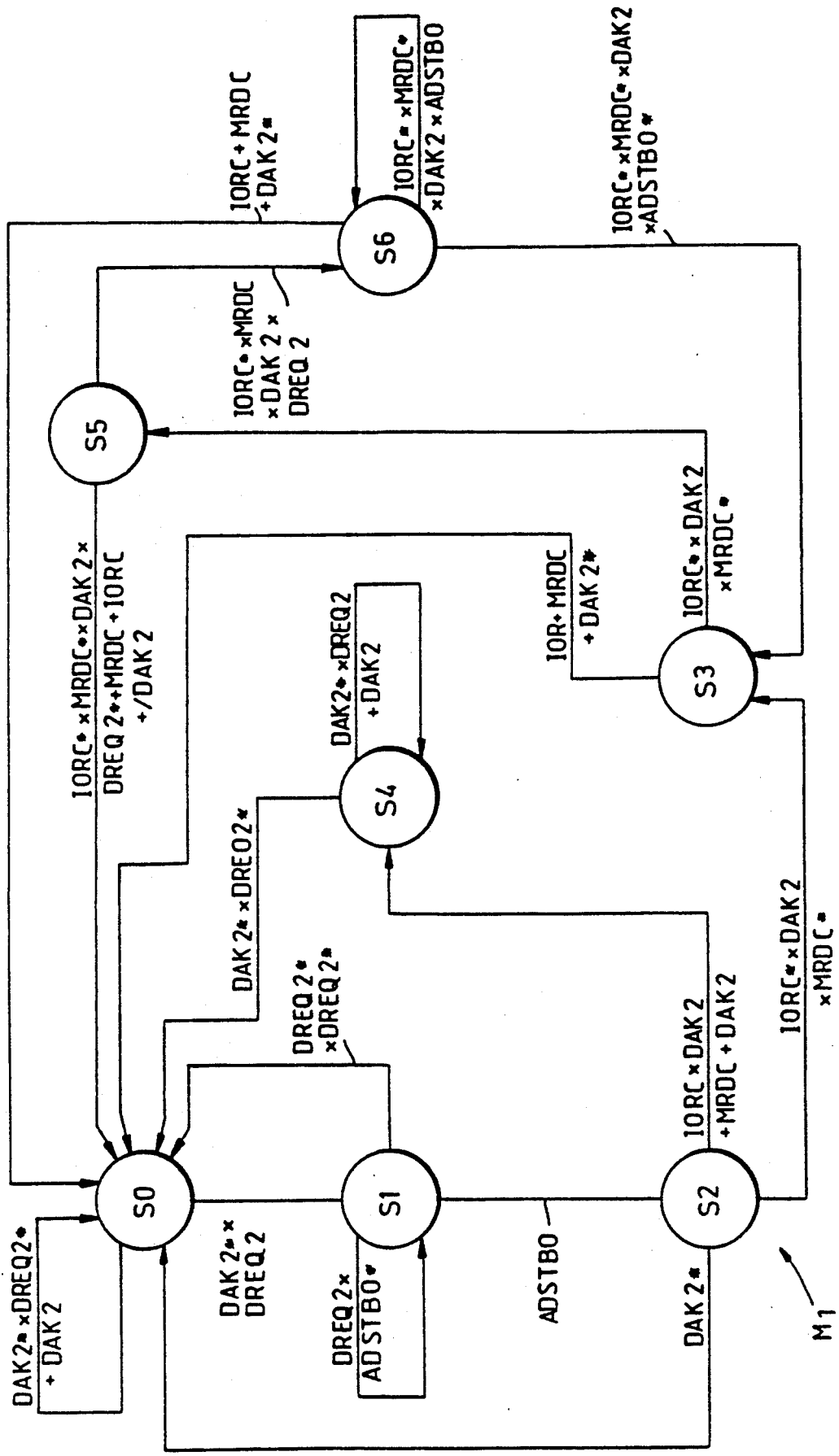
FIG. 3 is a schematic of the state machine used by the interface logic of FIG. 2.

Referring now to FIG. 3, the state machine M1 is used to facilitate the proper generation of the CLKNIORD* signal, which is used to enable the proper assertion of the NIORD* signal during verify transfers as demonstrated in the timing diagrams of FIGS. 4, 5, 6 and 7. In the state equations that follow, a particular signal condition is true when that signal is at a high state. The state machine M1 transitions occur on the rising edge of the DLCK signal, which is provided to the clock inputs of the flip-flops contained in the PAL 100.

State S0 is the initial state of the state machine M1, and it also serves as the rest state of the state machine M1 when no DMA transfers are taking place between the floppy disk controller 54 and the DMA controller 90. The state machine M1 remains in state S0 when the equation:

$$(DAK2^* \times DREQ2^*) + DAK2$$

is true. In other words, the state machine M1 remains in its initial or rest state S0 until the floppy disk controller 54 issues a DMA request. The state machine M1 also remains in state S0 if the DAK2* signal is asserted independently of the DREQ2 signal being asserted. The state machine M1 progresses from state S0 to state S1 when the equation:

$$DAK2^* \times DREQ2$$

is true. Therefore, the state machine M1 undergoes a transition from state S0 to state S1 when a DMA request, signified by the assertion of the DREQ2 signal, has been made by the floppy controller 54.

The state machine M1 remains in state S1 while the equation:

$$DREQ2 \times ADSTBO^*$$

is true. In state S1, the state machine M1 is essentially waiting for the ADSTBO signal to be asserted, signifying that the 8 higher order address bits are valid, before it may continue. The state machine M1 returns to state S0 if the equation:

$$DREQ2^* \times ADSTBO^*$$

is true. Therefore, if the DREQ2 signal is negated before the ADSTBO signal is asserted, then the address is not valid, and the state machine M1 returns to its S0 state. If the ADSTBO signal is asserted before the DREQ2 signal is negated, a valid DMA transfer is occurring, and the state machine M1 advances from state S1 to state S2.

The state machine M1 returns to state S0 from state S2 if the DAK2* signal is negated or raised to a high level while the state machine M1 is in state S2. The state machine M1 advances from state S2 to state S3 if the equation:

$$IORC^* \times DAK2 \times MRDC^*$$

is true. This equation is generally only true during a DMA verify cycle because, as shown in the timing diagrams, a verify cycle is the only cycle where both the IORC* signal and the MRDC* signal are negated or high at this time when the DAK2* signal is asserted. The IORC* and MRDC* signals are both negated in a verify transfer because no actual transfer of data occurs and the I/O control lines are held inactive. Therefore, the state machine M1 advances from state S2 to state S3 when a DMA verify cycle is taking place. If either the IORC* signal or the MRDC* signal are asserted in state S2 when the DAK2* signal is asserted, then a DMA write or DMA read, respectively, is taking place, and the state machine M1 advances from state S2 to state S4. This is evidenced by the equation:

$$(IORC \times DAK2) + (MRDC \times DAK2)$$

which advances the state machine M1 from state S2 to state S4.

Figure 4:
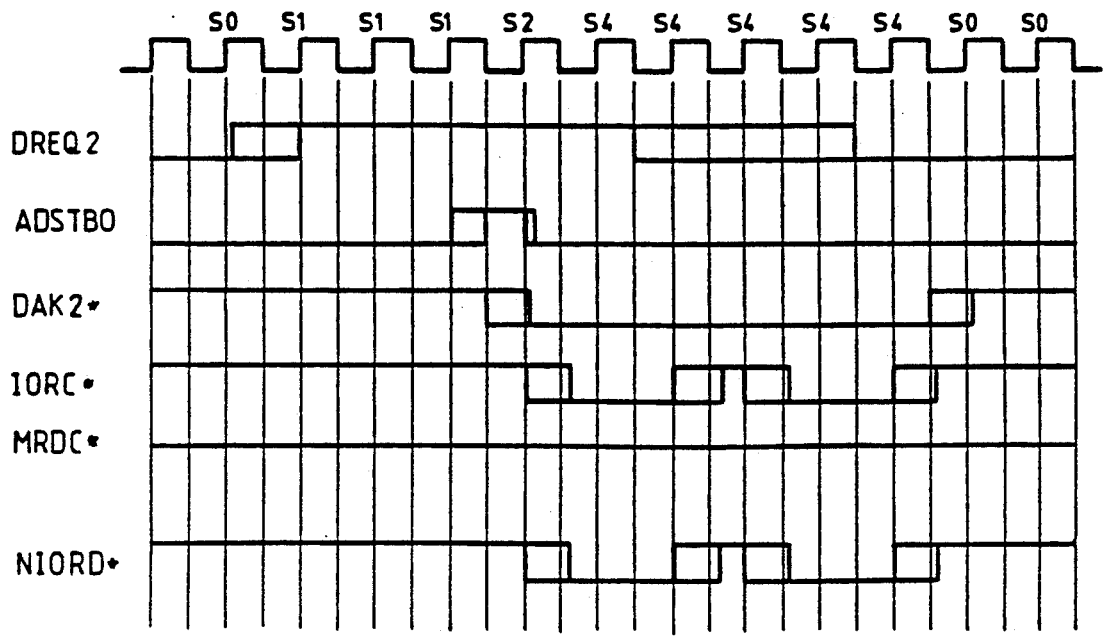
Figure 5:
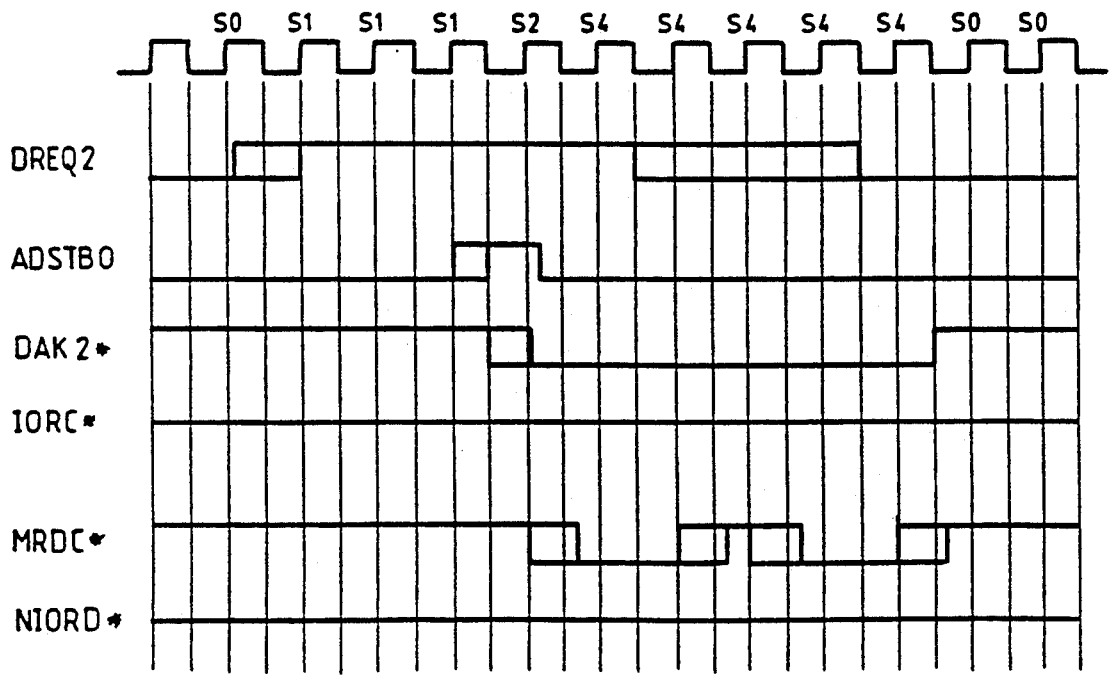

If the state machine M1 has advanced to state S4, then the cycle that is being executed is generally either a DMA write or DMA read cycle, and, as shown in FIGS. 4 and 5, state S4 is the state in which the actual transfer of data occurs. The state machine M1 remains in state S4 while either the data transfer is still occurring, signified by the DAK2* signal remaining asserted, or, if the DAK2* signal is negated, then the state machine M1 remains in state S4 if a new data transfer is about to take place, signified by the DREQ2 signal being asserted. Therefore, the state machine M1 generally remains in state S4 while the equation:

$$(DAK2^* \times DREQ2) + DAK2$$

remains true, which is generally until the data transfer is completed. The state machine M1 returns from state S4 to state S0 when the equation:

$$DAK2^* \times DREQ2^*$$

is true, which signifies that the DMA read or write transfer has been completed.

If the state machine M1 has advanced to state S3, then a DMA verify transfer is assumed to be taking place. The state machine M1 returns to state S0 from state S3 if any of the conditions for a DMA verify transfer, namely the status of the signals in the equation that advanced the state machine M1 from state S2 to state S3, are not met. For the state machine M1 to return from state S3 to state S0, the equation:

$$IORC + MRDC + DAK2^*$$

must be true. Therefore, if either the IORC* signal or the MRDC* signal are asserted in state S3, then a verify transfer is not taking place and the state machine M1 returns to state S0. A negation of the DAK2* signal in state S3, possibly by the centralized arbitration controller (not shown) preempting the DMA process, also returns the state machine M1 to state S0. This equation is the opposite of the equation:

$$IORC^* \times MRDC^* \times DAK2$$

which signified in state S2 that a verify transfer was occurring and was responsible for advancing the state machine M1 from state S2 to state S3 originally. Therefore, if the equation that is necessary for a valid DMA verify transfer to be occuring is no longer true in state S3, then it is assumed that either the verify transfer is completed or that a valid DMA verify transfer is not actually taking place, and the state machine M1 is returned to state S0. If the equation:

$$IORC^* \times MRDC^* \times DAK2$$

that advanced the state machine from state S2 to state S3 is still true in state S3, then the state machine M1 advances from state S3 to state S5 on the next rising edge of the DCLK signal.

As shown in FIGS. 6 and 7, when the state machine M1 has advanced to state S5, then generally a verify cycle has just occurred. The progression of the state machine M1 after the S5 state depends on whether another verify cycle is about to commence or whether the verify transfer is completed. This is determined by the DREQ2 signal, which is asserted if another verify cycle is to take place and is negated if the verify transfer is completed. The DREQ2 signal is the different component between the equation:

$$IORC^* \times MRDC^* \times DAK2 \times DREQ2$$

that progresses the state machine M1 from state S5 to state S6, and the first minterm of the equation:

$$(IORC^* \times MRDC^* \times DAK2 \times DREQ2^*) + MRDC + IORC + DAK2^*$$

which returns the state machine M1 from state S5 to state S0. If any of the last 3 minterms in the above equation that returns the state machine M1 from state S5 to state S0 are true, then a valid DMA verify transfer is not occurring and the state machine M1 returns to state S0.

When the state machine M1 has advanced to state S6, then it may either remain in state S6, return to state S3, dependent on the status of the ADSTBO signal, or return to state S0 if the conditions of a DMA verify transfer are not met. The state machine M1 remains in state S6 when the equation:

$$IORC^* \times MRDC^* \times DAK2 \times ADSTBO$$

is true, and the state machine M1 progresses from state S6 to state S3 when the equation:

$$IORC^* \times MRDC^* \times DAK2 \times ADSTBO^*$$

is true. In other words, if the conditions for a valid verify cycle are met and the ADSTBO signal is asserted in state S6, then the DMA controller 90 is updating the upper 8 bits in its address latch, and the state machine M1 remains in state S6. As shown in FIG. 7, if there are multiple address strobes in the verify transfer, the ADSTBO signal is asserted in state S6 and an extra S6 state is inserted in the progression of the state machine M1. If the ADSTBO signal is negated in state S6, then the state machine M1 returns to states S3 in anticipation of another verify cycle. If the equation:

$$IORC + MRDC + DAK2*$$

is true in state S6, then a valid DMA verify transfer is not actually taking place, and the state machine M1 returns from state S6 to state S0.

The state machine M1 and the above-mentioned bus signal inputs are used to generate an output signal called CLKNIORD*, the equation for which is:

$$CLKNIORD = (DAK2 \times IORC* \times MRDC* \times S2) + (ADSTBO* \times DAK2 \times IORC* \times MRDC \times (S2+S6))$$

The CLKNIORD* signal is asserted at the appropriate time during a DMA verify transfer between the floppy disk 54 controller and the DMA controller 90. As shown in the first minterm of the above equation, the CLKNIORD* signal is asserted in the state following state S2 if the conditions for a valid verify transfer, namely the DAK2 signal asserted and the IORC* and MRDC* signal negated, are met. As shown in the second minterm of the above equation, the CLKNIORD* signal is asserted in the state following either state S2 or state S6 if the conditions for a verify transfer are met and the ADSTBO signal is negated.

The CLKNIORD* signal is combined with the IORC* signal from the bus to produce the NIORD* signal, the equation for which is:

$$NIORD = IORC + CLKNIORD$$

The PAL 100 generally acts as an AND gate with the IORC* signal and the CLKNIORD* signal as inputs and the NIORD* signal as the output. Therefore, the NIORD* signal is asserted whenever the IORC* signal is asserted to maintain the proper signal generation of the IORC* signal to the floppy controller 54 during DMA read and DMA write transfers. The NIORD* signal is also asserted at the appropriate time during DMA verify cycles due to the CLKNIORD* signal being asserted to provide clocking signals to the floppy controller 54 to prevent FIFO overrun.

Referring now to FIG. 4, a timing diagram of a DMA write cycle incorporating the present invention to the floppy disk controller 54 is shown. In state S0 the floppy disk controller 54 makes a DMA request by asserting the DREQ2 signal, progressing the state machine M1 to state S1. This is followed by a DMA acknowledge (DAK2) from the DMA controller coupled with the assertion of the ADSTBO signal by the DMA controller to latch the upper 8address bits of the address destination, this causing the state machine M1 to progress to state S2. While in state S2, the IORC* signal is asserted, signifying that the floppy controller 54 may drive its data onto the bus and progressing the state machine M1 to state S4. The assertion of the IORC* signal in state S2 is responsible for the basically simultaneous assertion of the NIORD* signal. The MRDC* signal is kept negated high throughout because this is a DMA write cycle. In state S4 the actual transfer of data takes place from the floppy controller 54 to its memory destination and as many S4 states as are needed are inserted here during this data transfer. At some point during the transfer of data in state S4, the DREQ2 signal is negated. When the data transfer is completed, the DAK2* signal is negated, causing the state machine M1 to return from state S4 to state S0.

Referring now to FIG. 5, a DMA read cycle is shown which is similar to the DMA write cycle of FIG. 4 except that in this case the IORC* signal is negated (high) throughout, causing the NIORD* signal to be similarly negated, and the MRDC* signal is asserted at the appropriate times while the state machine M1 is in state S4.

Referring now to FIG. 6, a DMA verify cycle is similar to the DMA write and read cycles of FIGS. 4 and 5, respectively, except that in this case both the IORC* and MRDC* signals are negated (high) throughout. However, the NIORD* signal is asserted at the appropriate times in state S3 of the state machine M1 due to the CLKNIORD* signal (not shown) being asserted. Referring now to FIG. 7, a DMA verify cycle with multiple address strobe (ADSTBO) signals is similar to the DMA verify cycle of FIG. 6 except that the ADSTBO signal is asserted a second time in state S6. This results in an extra S6 state being inserted into the progression of the state machine M1, causing the subsequent assertion of the NIORD* signal to be delayed 1 DCLK cycle.

Figure 8:
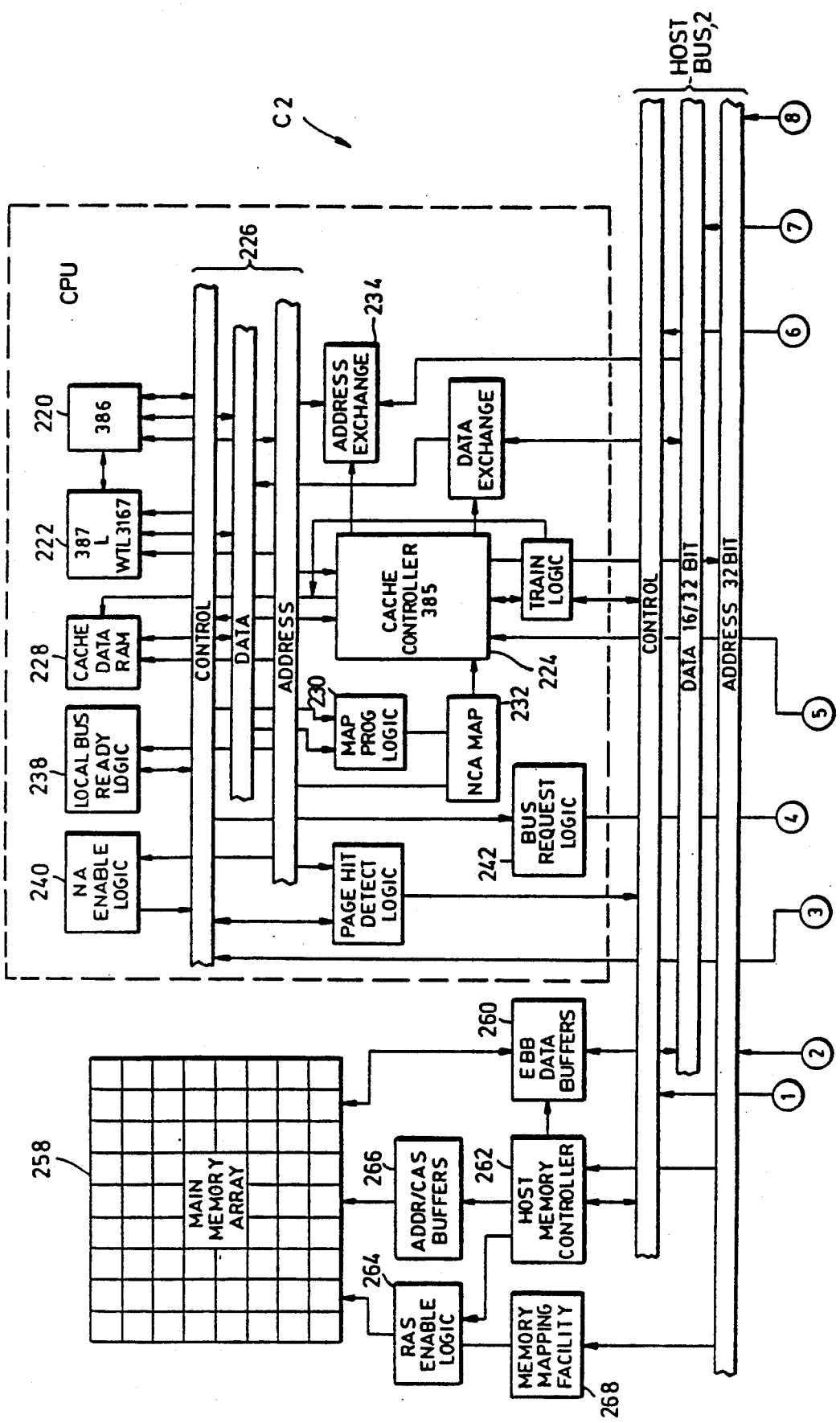

The second design according to the present invention is similar to the first but is intended for use with the Extended Industry Standard Architecture (EISA). Referring now to FIGS. 8 and 9, the letter C2 designates generally an EISA computer system incorporating the present invention. System C2 is comprised of a number of block elements interconnected via four buses. For the sake of clarity, system C2 is shown in two portions with the interconnections between FIGS. 8 and 9 designated by reference to the circled numbers one to eight. Many of the details of the portion of the system illustrated in FIGS. 8 and 9 that are not discussed in detail below are not significant to the present invention other than to illustrate an example of a fully configured computer system.

In FIG. 8, a computer system C2 is depicted. A central processing unit CPU comprises a processor 220, a numerical coprocessor 222 and a cache memory controller 224 and associated logic circuits connected to a local processor bus 226. Associated with cache controller 224 is high speed cache data random access memory 228, noncacheable memory address map programming logic circuitry 230, noncacheable address memory 232, address exchange latch circuitry 234 and data exchange transceiver 236. Associated with the CPU also are local bus ready logic circuit 238, next address enable logic circuit 240 and bus request logic circuit 242.

In the drawings, system C2 is configured having the processor bus 226, a host bus 244, an Extended Industry Standard Architecture (EISA) bus 246 (FIG. 9) and an X bus 290. The EISA specification Version 3.0 is included as Appendix 1 to explain the requirements of an EISA system. The portion of system C2 illustrated in FIG. 9 is essentially a configured EISA system which includes the necessary EISA bus 246, an EISA bus controller 248, data latches and transceivers 250 and address latches and buffers 252 to interface between the EISA bus 246 and the host bus 244. Also illustrated in FIG. 9 is an integrated system peripheral 254, which incorporates a number of the elements used in an EISA-based computer system, among these a DMA controller 256.

The main memory array 258 is preferably dynamic random access memory. The memory 258 interfaces with the host bus 244 via a data buffer circuit 260, a memory controller circuit 262 and a memory mapping facility 268. The buffer 260 performs data transceiving and parity generating and checking functions.

The EISA bus 246 includes ISA and EISA control buses 276 and 278, ISA and EISA data buses 280 and 282 and a system address bus 284, a latched ISA address bus 286, and a latched EISA address bus 288. System peripherals are interfaced via the X bus 290 in combination with the ISA control bus 276 from the EISA bus 246. Control and data/address transfer for the X bus 290 are facilitated by X bus control logic 292, data transceivers 294 and address buffers 296.

Attached to the X bus 290 are various peripheral devices such as keyboard/mouse controller 298 which interfaces the X bus 290 with a suitable keyboard and mouse via connectors 300 and 302, respectively. Also attached to the X bus 290 are read only memory circuits 306 which contain basic operations software for the system C2 and for system video operations. A serial communications port 308 is also connected to the system C2 via the X bus 290. Floppy and fixed disk support, a parallel port, a second serial port, and video support circuits are provided in block circuit 310. A block circuit 316 generally containing various floppy disk logic, including a floppy disk controller 318 (FIG. 10) and a programmable array logic (PAL) device 200 (FIG. 10) that generates a signal for the floppy disk controller 318 according to the present invention, is also attached to the X bus 290. In this embodiment, the preferred floppy disk controller 318 is the Intel 82077.

Figure 10:
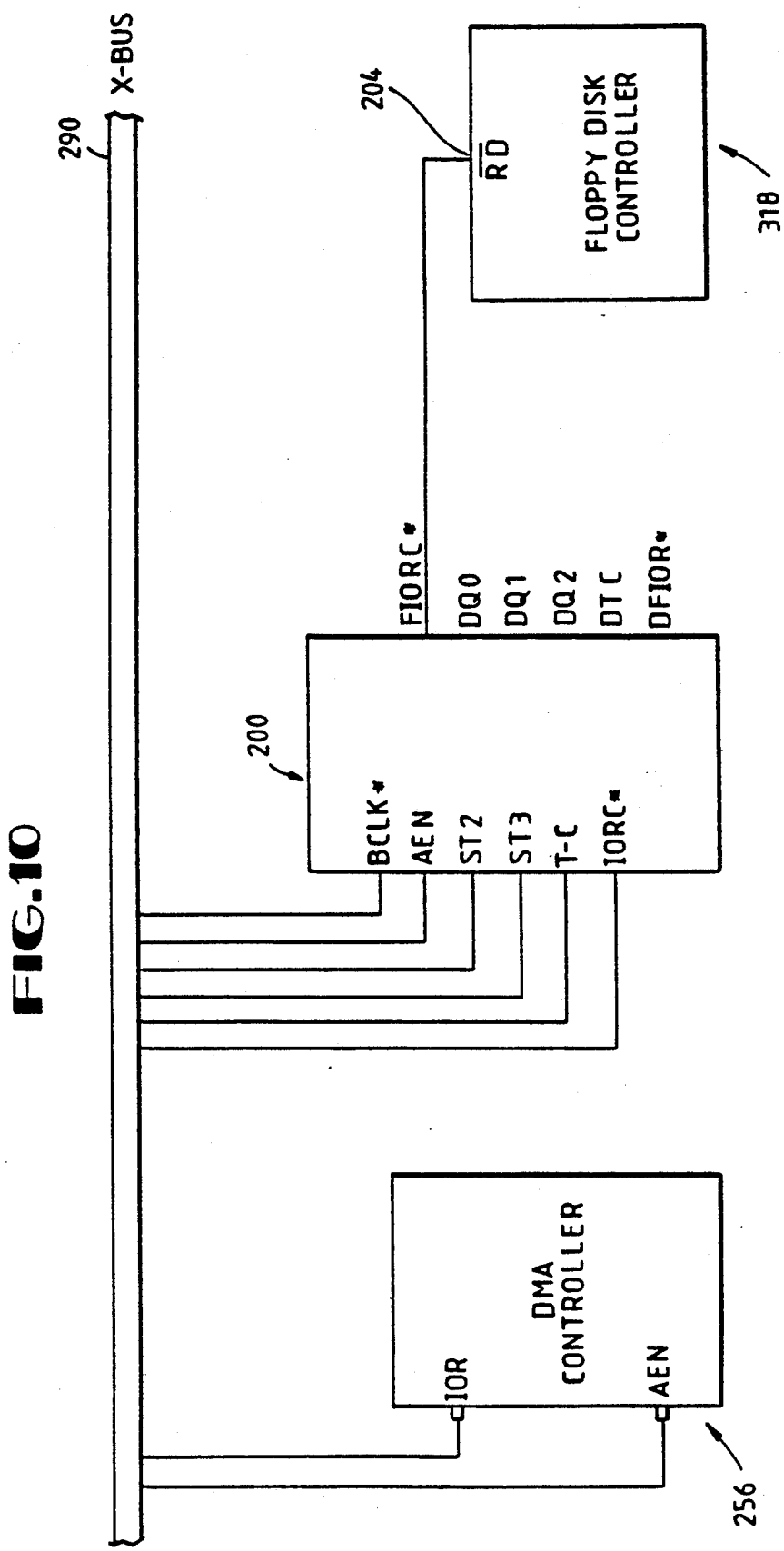
FIG. 10 is a more detailed block diagram of the floppy disk logic of FIG. 9 interfaced between the DMA controller and the floppy disk controller of FIG. 9 according to the present invention.

Referring now to FIG. 10, the second design includes a programmable array logic (PAL) device 200 that uses certain signal inputs from the computer system C2 as well as an internal state machine M2 (FIG. 11) to generate a new version of the IORC* signal called FIORC* that is provided to the RD* input of the floppy disk controller 318. The bus signals generally used as inputs to the PAL 200 from the DMA controller 256 include the IORC* signal and the AENO signal. The AENO signal is high during valid I/O operations to the system board according to the EISA specification. Other bus signal inputs to the PAL 200 include the BCLK* signal, which is provided to flip-flops located in the PAL 200 and is used to advance the state machine M2 and the T-C or terminal count signal. The ST<2> and ST<3> lines are output from the integrated system peripheral (ISP) 254 (FIG. 9) and indicate, when asserted, that the DMA controller 256 is the current bus master.

The PAL 200 uses these input signals to generate an internal 3-bit state machine M2. The different states of the state machine M2 are represented by each of the bits DQ0, DQ1, and DQ2 which are represented as outputs from the PAL 200. The state machine M2 utilizes the T-C signal as well as the AEN signal to coordinate the generation of a new DMA terminal-count signal called DT-C, which is represented as an output of the PAL 200. The state machine M2 also coordinates the proper generation of a signal called DFIOR*, which is output from the PAL 200 and is asserted at the appropriate time during a DMA verify transfer. The DFIOR* signal and the IORC* are combined inside the logic of the PAL 200 to produce the FIORC* signal, which is an output of the PAL 200 and is connected to the RD* input of the floppy disk controller 318.

Figure 11:
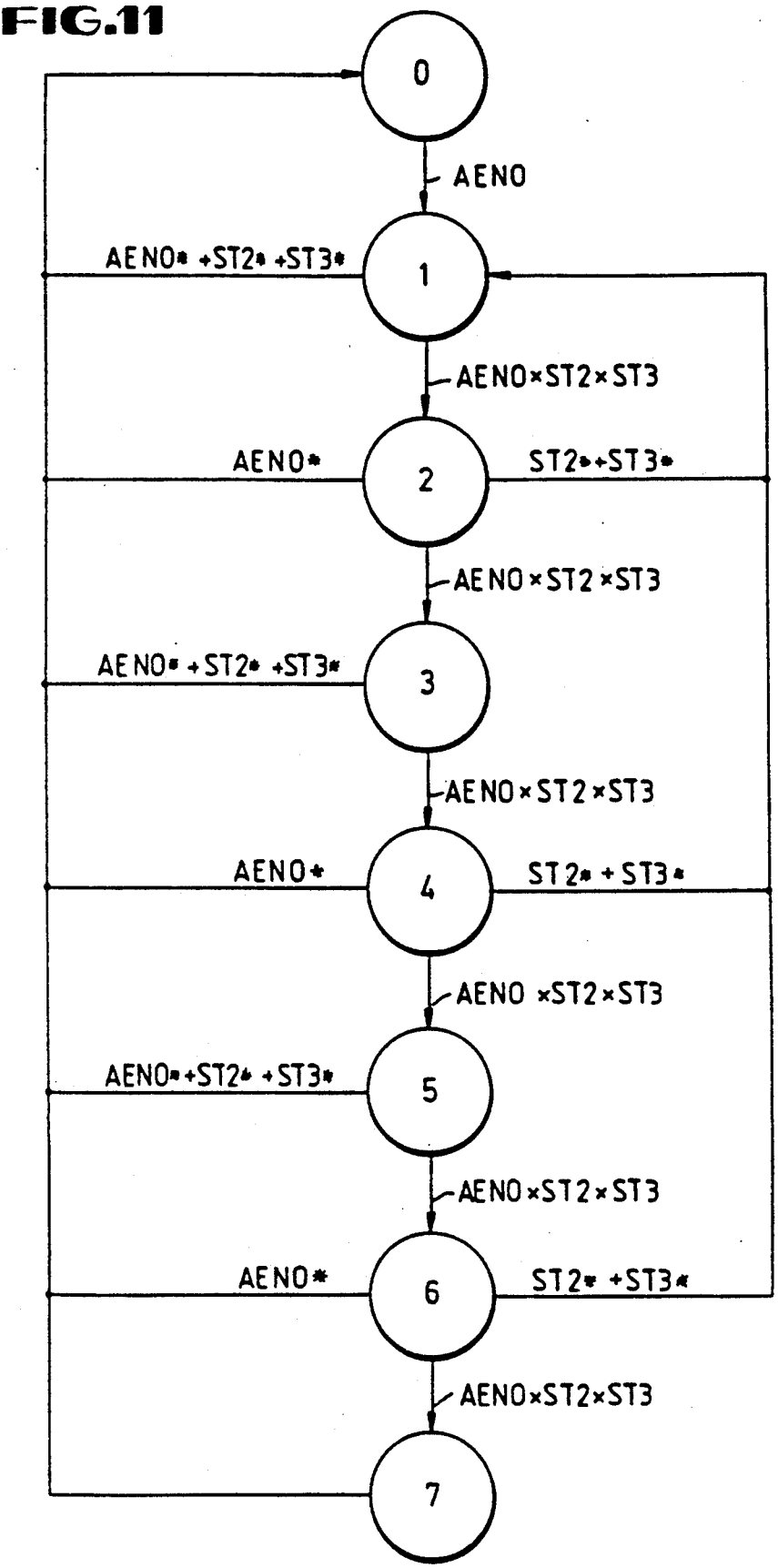
FIG. 11 is a schematic of the state machine used by the floppy disk logic of FIG. 10, and FIGS. 12, 13, 14, and 15 are timing diagrams of various DMA transfers incorporating the second design according to the present invention.

Referring now to FIG. 11, the state machine M2 generally includes eight states, states 0 through 7, through which it progressively counts upward. The state machine M2 is also rotational in that when it reaches state 7 it returns to state 0 and continues counting. The state machine M2 generally remains in its initial state of state 0 until a I/O cycle is initiated as indicated by the AENO* signal being asserted. When the AENO* signal is asserted, an I/O cycle has begun and the state machine M2 progresses from state 0 to state 1. Thereafter, in order for the state machine M2 to progress from state 1 onward, the AENO*, ST2, and ST3 signals must be asserted. When the status bits ST2 and ST3 are asserted with the AENO* signal asserted, then the current bus cycle is a DMA cycle. Therefore, while a DMA cycle is in progress, the state machine M2 generally progresses sequentially from state 0 to state 7 before returning to state 0 and then repeating. The state machine M2 progresses through its states while the AENO*, ST2, and ST3 signals are asserted, and a negation of the AENO* signal returns the state machine M2 to state 0 from any of the other states. A negation of either of the ST2 or ST3 signals in states 1, 3 or 5 also returns the state machine M2 to state 0. A negation of the ST2 or ST3 signals in states 2, 4 or 6 returns the state machine M2 to state 1.

The PAL 200 utilizes the state machine M2 to aid in the generation of of a new T-C or terminal count signal called DT-C, which is provided by a flip-flop in the PAL 200 clocked by the BCLK* signal, the equation of which is:

DT-C := (AENO × T-C × state 7)
+ (AENO × DT-C × (state 0 + state 1 + state 2 + state 3 + state 4 + state 5))

The PAL-generated DT-C signal is asserted when the state machine M2 reaches state 7 during a DMA cycle when the DMA channel's word count has reached terminal count as indicated by the presence of the T-C signal. The DT-C signal remains asserted until either the AENO* signal is negated, which is when the DMA transfer is completed, or until the state machine M2 has reached state 6, whichever occurs first.

The PAL 200 utilizes the internally generated state machine M2 states as well as the DT-C signal and various other bus signals to generate a signal called DFIOR*, which is provided by a flip-flop located in the PAL 200 clocked by the BCLK* signal, the equation of which is:

DFIOR := (AENO × state 3 × ST2 × ST3 × DT-C*)
+ (AENO × DFIOR × (state 4 + state 5 + state 0 + state 1))

The DFIOR* signal is asserted at the appropriate time during verify cycles between the DMA controller 256 and the floppy disk controller 318. As shown in the first minterm of the above equation, the DFIOR* signal is generally asserted during all DMA cycles on the falling edge of the BCLK signal when the state machine M2 is in state 3, unless the DT-C signal is asserted. The DFIOR* signal remains asserted until either the DMA cycle is completed, signified by the negation of the AEN* signal, or until the state machine M2 reaches state 6, which ever occurs first. Therefore, the DFIOR* signal is generally asserted during states 4, 5, 6 of the state machine M1 unless the AENO* signal is asserted during this time.

The DFIOR* signal is combined with the IORC* signal to produce the FIORC* signal, the equation for which is:

FIORC=IORC+DFIOR

The IORC* signal is included in the generation of the FIORC* signal to ensure that the FIORC* signal is asserted whenever the IORC* signal is asserted, this to maintain the proper generation of the IORC* signal as supplied to the floppy disk controller 318 during DMA read and DMA write transfers.

Figure 14:
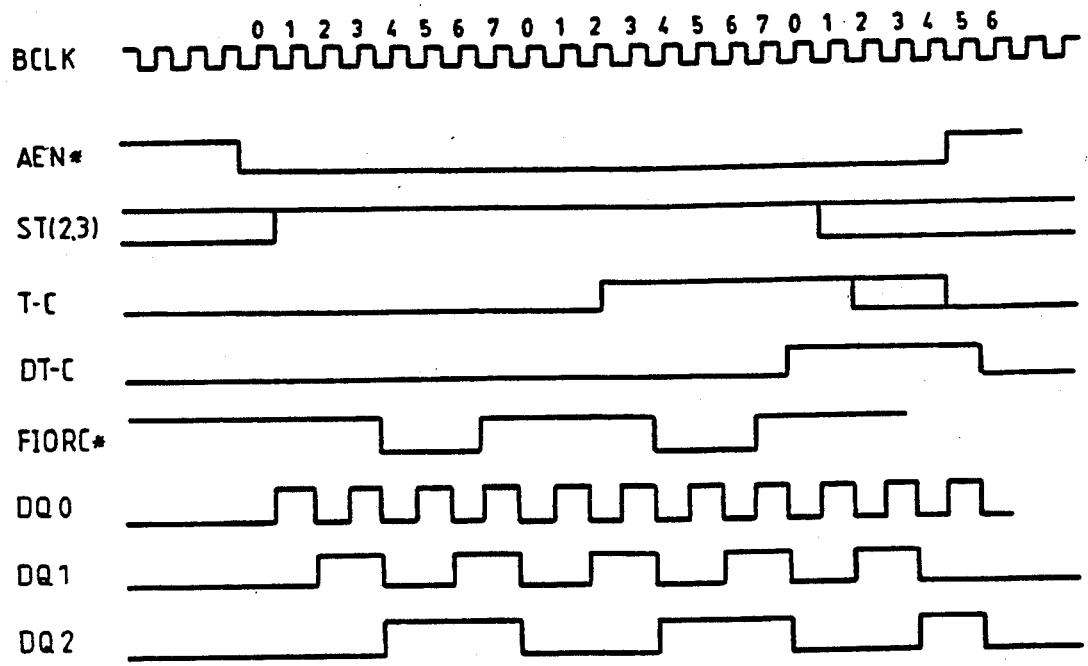

Referring now to FIGS. 12, 13 and 14, a demand mode verify cycle using the ISA compatible or normal cycle control sequence, a demand mode verify cycle using Type "B" cycle control, and a demand mode verify cycle with autoinitialize, respectively are shown. Each cycle begins with the assertion of the AENO* signal, which progresses the state machine M2 from state 0 to state 1. The assertion of the status lines ST<2,3> in the beginning of state 1 allows the state machine M2 to continue counting sequentially through its states as shown. In each of these demand verify cycles, the AENO*, ST2, and ST3 signals remain asserted until several states after the DMA terminal count (DT-C) signal is asserted. The FIORC* signal is asserted once every 8 BCLK cycles when the state machine M2 is in states 4, 5 and 6, this because repeated verify transfers during block or demand DMA requests generally require 8 BCLK cycles. In the demand verify cycle with autoinitialize or buffer chaining timing diagram of FIG. 14, the AENO* signal is asserted for additional states, as are both the T-C signal and the DT-C signal.

Figure 15:
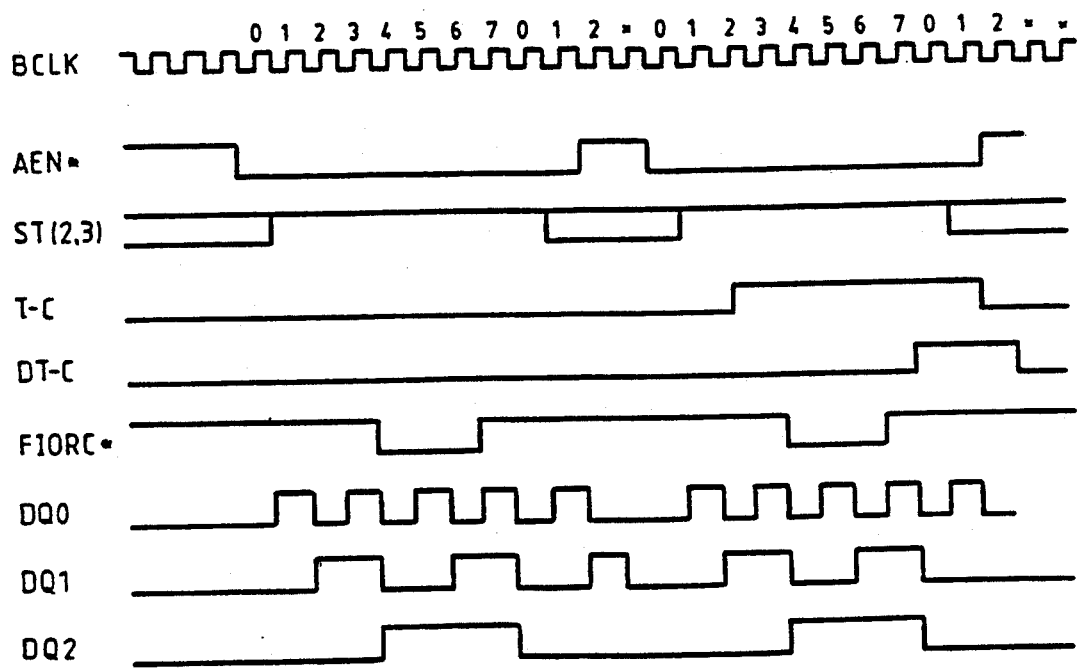

Referring now to FIG. 15, a single mode verify cycle using type "B" cycle control is shown. The single mode dictates that each cycle type is run as a single cycle transfer. Therefore, after the first transfer cycle, where the FIORC* signal was asserted in states 4, 5 and 6, the AENO* signal is negated at the beginning of state 2 following the first transfer cycle, effectively short-circuiting the state machine M2 from state 2 to state 0. The state machine M2 resumes counting from state 0 when the AENO* signal is asserted, and this cycle repeats itself.

Therefore, two methods for generating a read FIFO strobe pulse during DMA verify transfers are disclosed. This prevents overrun errors that would occur in the FIFO of the 82077, allowing it to operating properly in FIFO mode with older or noncompatible systems software which uses verify mode operations to determine floppy disk transfer rates.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A system for transferring data, comprising:
    a direct memory access controller which produces a first control signal relating to data transfer during operations of a first type and does not produce said first control signal during operations of a second type, and wherein said direct memory access controller produces a second control signal and does not produce said first control signal during operations of a third type;
    a data transfer device which transfers data responsive to the receipt of a data transfer signal;
    means for producing a replica signal of said first control signal when said direct memory access controller is performing operations of the second type and for combining said replica signal with said first control signal to produce a combined signal, said combined signal being connected to said data transfer device as said data transfer signal, and wherein said replica producing means does not produce said replica signal when said direct memory access controller is performing operations of the third type.

2. The data transfer system of claim 1, where said data transfer device is a floppy disk controller.

3. The data transfer system of claim 2, wherein said floppy disk controller includes a first in first out data buffer and wherein said data transfer signal controls transferring data from said buffer.

* * * * *